(12) United States Patent
Ishikawa et al.

(10) Patent No.: US 8,970,154 B2
(45) Date of Patent: Mar. 3, 2015

(54) POWER CONVERSION APPARATUS

(75) Inventors: Shuta Ishikawa, Tokyo (JP); Shinichi Furutani, Tokyo (JP); Masanori Kato, Tokyo (JP); Yoichi Egashira, Tokyo (JP); Yuki Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 13/880,292

(22) PCT Filed: Nov. 1, 2011

(86) PCT No.: PCT/JP2011/075147
§ 371 (c)(1),
(2), (4) Date: Apr. 18, 2013

(87) PCT Pub. No.: WO2012/060357
PCT Pub. Date: May 10, 2012

(65) Prior Publication Data
US 2013/0214717 A1    Aug. 22, 2013

(30) Foreign Application Priority Data

Nov. 5, 2010  (JP) ................................. 2010-248006

(51) Int. Cl.
*H02P 1/30*     (2006.01)
*H02P 21/05*    (2006.01)
*H02M 7/5387*   (2007.01)
*H02M 5/458*    (2006.01)
*H02M 1/00*     (2006.01)

(52) U.S. Cl.
CPC ............ *H02P 21/05* (2013.01); *H02M 7/53875* (2013.01); *H02M 5/458* (2013.01); *H02M 2001/0022* (2013.01); *H02M 2001/0025* (2013.01)

USPC ............ 318/503; 318/504; 318/438; 318/722

(58) Field of Classification Search
USPC ......... 318/503, 400.26, 400.3, 722, 504, 438; 363/13, 34, 37, 45
See application file for complete search history.

(56) References Cited

U.S. PATENT DOCUMENTS

| 5,420,492 | A  | * | 5/1995 | Sood et al. ...................... 318/809 |
| 5,723,968 | A  | * | 3/1998 | Sakurai .......................... 318/802 |
| 6,396,229 | B1 | * | 5/2002 | Sakamoto et al. ........ 318/400.02 |
| 6,690,137 | B2 | * | 2/2004 | Iwaji et al. ..................... 318/700 |
| 8,698,433 | B2 | * | 4/2014 | Green ...................... 318/400.02 |

FOREIGN PATENT DOCUMENTS

| JP | 2007 181358 | 7/2007 |
| JP | 2009 17673  | 1/2009 |

OTHER PUBLICATIONS

International Search Report Issued Jan. 31, 2012 in PCT/JP11/75147 Filed Nov. 1, 2011.

* cited by examiner

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

A resonance suppression control block includes a high-pass filter for extracting an AC component of DC link voltage, and a gain section for outputting a correction signal obtained by multiplying the AC component by a gain. A control unit controls an inverter based on a signal obtained by adding the correction signal to the voltage instruction. Thus, a power conversion apparatus with a simple configuration can be obtained that can suppress resonance of a DC link section and omit extra work for performing adjustment again in accordance with a power supply frequency.

16 Claims, 12 Drawing Sheets

FIG. 8
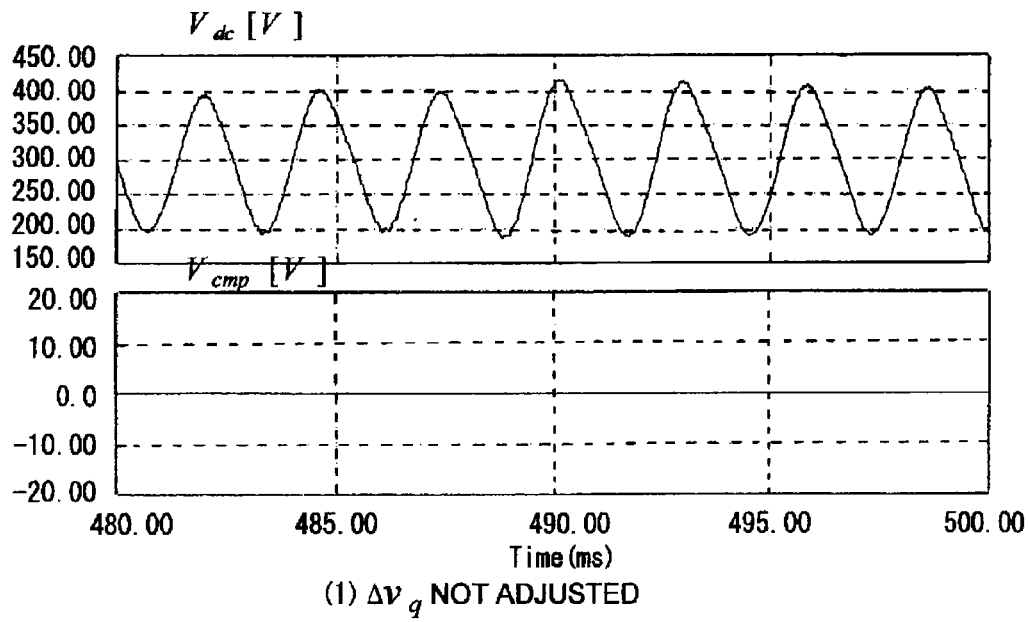
(1) $\Delta v_q$ NOT ADJUSTED
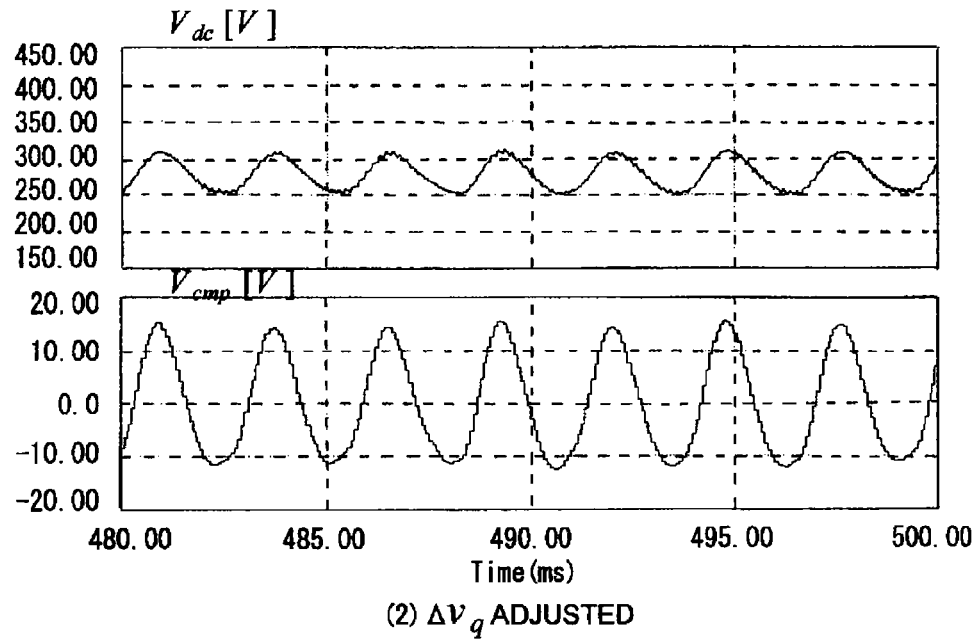
(2) $\Delta v_q$ ADJUSTED

POWER CONVERSION APPARATUS

TECHNICAL FIELD

The present invention relates to a power conversion apparatus used for a purpose such as driving of an AC motor, and having a converter and an inverter which are integrated with each other via a DC link section.

BACKGROUND ART

A main circuit of a power conversion apparatus for driving an AC motor is composed of a converter which rectifies AC power from a system power supply, and an inverter which performs reconversion to AC power suitable for the AC motor, and a smoothing capacitor is connected to a DC link which is a DC link section between the converter and the inverter. When the power conversion apparatus is connected to the system power supply, an LC resonance circuit is formed by a reactor of the system power supply and the smoothing capacitor. In a three-phase diode converter, it is known that, along with rectification operation, a pulsation having six times of the power supply frequency occurs on the DC output side. Therefore, if the resonance frequency coincides with six times of the system power supply frequency, the DC link voltage in an inverter main circuit largely oscillates. As a result, breakage of main circuit components can occur or AC motor control can become unstable.

Particularly, in the case of using a smoothing capacitor having a small capacitance, the resonance frequency with the reactor increases, often resulting in the above problem. In response to the above problem, techniques directed to resonance suppression are proposed.

For example, Patent Document 1 employs a method of: extracting a pulsation component of the DC link voltage; instead of obtaining a differential amount of the oscillation, obtaining a variation amount of the oscillation per a predetermined time by a method using pseudo-differential for generating an amount for phase leading; and correcting the frequency of the inverter output voltage by using the obtained signal, thereby suppressing the pulsation of the DC link voltage. Then, the phase leading processing of generating a differential signal of the DC link voltage is designed such that, particularly, a specific phase leading amount occurs on a frequency component six times as high as the power supply frequency.

However, if the resonance suppression is performed, torque ripple of the AC motor increases. Therefore, for example, in Patent Document 2, the resonance suppression is performed only when an LC resonance frequency coincides with six times of the power supply frequency. When they do not coincide with each other, the resonance suppression is not performed, whereby increase in the torque ripple can be prevented as much as possible.

CITATION LIST

Patent Document

Patent Document 1: Japanese Laid-Open Patent Publication No. 2007-181358 (FIG. 10, claim 2 in page 2, paragraphs [0034], etc.)
Patent Document 2: Japanese Laid-Open Patent Publication No. 2009-017673 (FIG. 1, abstract and solution in page 1, etc.)

SUMMARY OF THE INVENTION

Problems to be Solved by the Invention

The apparatus of Patent Document 1 needs to use a pseudo-differential component, resulting in complication of a control block. In addition, since parameter design adjustment for the phase leading processing needs to be performed in accordance with the frequency of the system power supply, there is a problem that, if the apparatus is connected to a power supply having another frequency, extra work occurs for performing the parameter adjustment again.

In addition, in the apparatus of Patent Document 2, since whether or not to perform resonance suppression is determined by only an LC resonance frequency, there is a problem that it cannot be always ensured that the resonance suppression should be performed only when necessary.

The present invention has been made to solve the above problems, and an object of the present invention is to obtain a power conversion apparatus with a simple configuration that can suppress resonance on a DC link section and can save extra work for performing the adjustment in accordance with the power supply frequency again.

Means of Solution to the Problems

A power conversion apparatus according to the first invention includes a converter connected between an AC power supply and a DC link section, for converting AC power of the AC power supply to DC power and outputting the DC power to the DC link section; an inverter connected between the DC link section and an AC load, for converting DC power of the DC link section to AC power and supplying the AC power to the AC load; a capacitor connected in the DC link section; and a control section for controlling the inverter based on a voltage instruction. In addition, the power conversion apparatus includes: a voltage detection section for detecting voltage of the DC link section; a filter section for extracting an AC component of the voltage detected by the voltage detection section; and a gain section for multiplying the AC component extracted by the filter section, by a predetermined gain, thereby outputting a correction signal. In addition, the control section controls the inverter based on a signal obtained by adding the correction signal to the voltage instruction. In addition, the power conversion apparatus includes peak value deriving means for outputting a peak value of the AC component extracted by the filter section, so that the magnitude of the correction signal is adjusted based on the peak value of the AC component outputted from the peak value deriving means.

A power conversion apparatus according to the second invention includes a converter connected between an AC power supply and a DC link section, for converting AC power of the AC power supply to DC power and outputting the DC power to the DC link section; an inverter connected between the DC link section and an AC load, for converting DC power of the DC link section to AC power and supplying the AC power to the AC load; a capacitor connected in the DC link section; and a control section for controlling the inverter based on a voltage instruction. In addition, the power conversion apparatus includes a voltage detection section for detecting voltage of the DC link section; a filter section for extracting an AC component of the voltage detected by the voltage detection section; and a gain section for multiplying the AC component extracted by the filter section, by a predetermined gain, thereby outputting a correction signal. In addition, the control section controls the inverter based on a signal obtained by adding the correction signal to the voltage instruction. In addition, the power conversion apparatus includes maximum value deriving means for outputting a maximum value of the voltage of the DC link section detected by the voltage detection section, so that the magnitude of the correction signal is adjusted based on the maximum value of the voltage of the DC link section outputted from the maximum value deriving means.

A power conversion apparatus according to the third invention includes a converter connected between an AC power supply and a DC link section, for converting AC power of the AC power supply to DC power and outputting the DC power to the DC link section; an inverter connected between the DC link section and an AC load, for converting DC power of the DC link section to AC power and supplying the AC power to the AC load; a capacitor connected in the DC link section; and a control section for controlling the inverter based on a voltage instruction. In addition, the power conversion apparatus includes a voltage detection section for detecting voltage of the DC link section; a filter section for extracting an AC component of the voltage detected by the voltage detection section; and a gain section for multiplying the AC component extracted by the filter section, by a predetermined gain, thereby outputting a correction signal. In addition, the control section controls the inverter based on a signal obtained by adding the correction signal to the voltage instruction. In addition, the power conversion apparatus includes minimum value deriving means for outputting a minimum value of the voltage of the DC link section detected by the voltage detection section, so that the magnitude of the correction signal is adjusted based on the minimum value of the voltage of the DC link section outputted from the minimum value deriving means.

Effect of the Invention

As described above, the power conversion apparatus according to the present invention adds, to the voltage instruction, the correction signal obtained by multiplying the AC component extracted from the detected voltage of the DC link section, by a gain, and just by such a configuration, makes it possible to suppress resonance of the DC link section and simplify the apparatus while omitting extra work for performing adjustment again in accordance with the power supply frequency.

BRIEF DESCRIPTION OF THE DRAWINGS

FIG. 8 is a characteristic diagram showing the difference based on whether or not to perform resonance suppression, according to embodiment 1 of the present invention.

DESCRIPTION OF EMBODIMENTS

Embodiment 1

Figure 1:
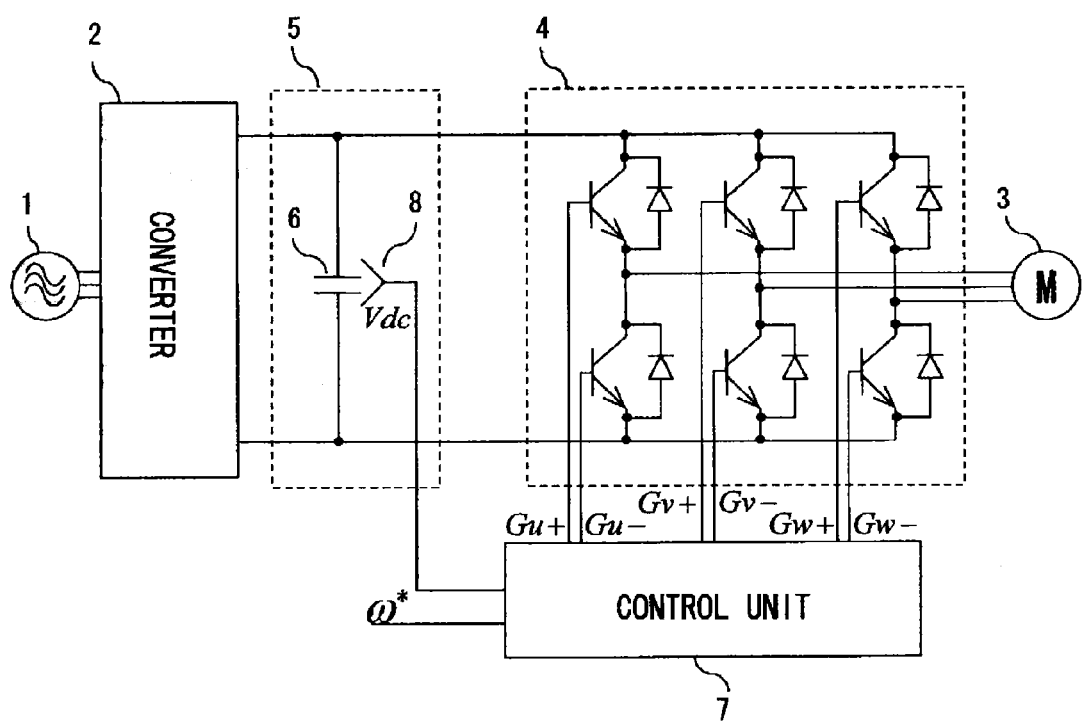
FIG. 1 is a block diagram showing the configuration of a power conversion apparatus according to embodiment 1, 2, or 3 of the present invention.

FIG. 1 is a configuration diagram of a power conversion apparatus according to embodiment 1 of the present invention. The power conversion apparatus includes: a converter 2 which converts AC power of a three-phase AC power supply 1 to DC power and outputs the DC power to a DC link section 5; and an inverter 4 which receives the DC power from the DC link section 5 and outputs AC power to supply the AC power to a load motor 3 as an AC load. In the DC link section 5 which is connected between the converter and the inverter and transmits DC power therebetween, a capacitor 6 is connected. A control unit 7 as a control section controls the inverter 4 based on a voltage instruction, as described later.

Then, DC link voltage Vdc is detected by the voltage detection section 8, and gate signals Gu+, Gu−, Gv+, Gv−, Gw+, and Gw− are generated by the control unit 7.

Figure 2:
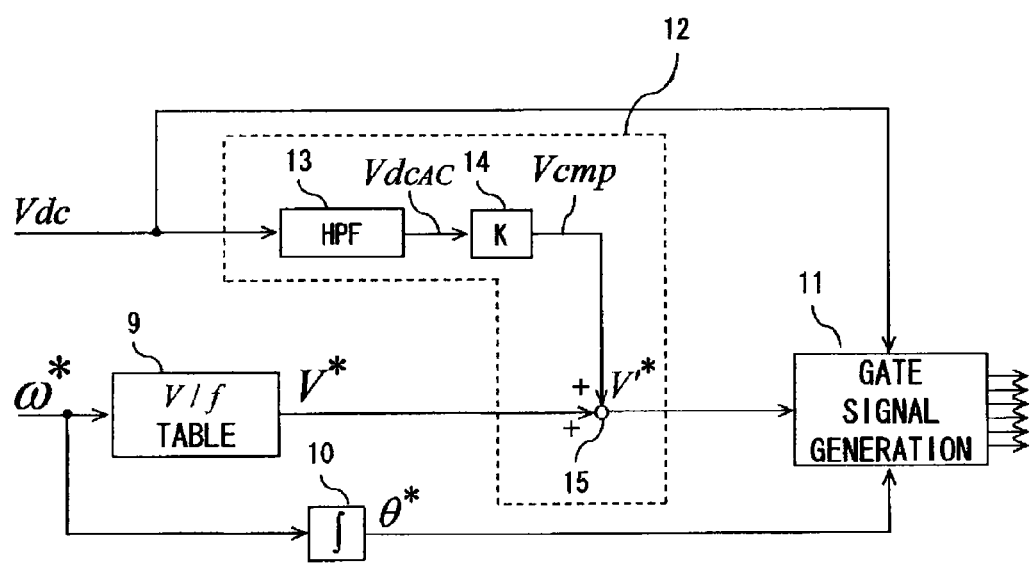
FIG. 2 is a block diagram showing the internal configuration of a control unit 7 according to embodiment 1 of the present invention.

FIG. 2 is a control block diagram showing the internal configuration of the control unit 7 shown in FIG. 1. Here, resonance suppression control is added to a V/f control system which keeps the ratio between the motor voltage and the motor frequency constant.

The control unit 7 receives the DC link voltage Vdc and a frequency instruction ω* which is a velocity instruction, and outputs the gate signals Gu+, Gu−, Gv+, Gv−, Gw+, and Gw−.

A V/f table 9 as a voltage instruction generation section receives the frequency instruction ω* and outputs a voltage instruction amplitude V* via the table 9. In addition, an integrator 10 integrates the frequency instruction ω* to output a phase θ* of the voltage instruction.

A gate signal generation section 11 generates an output voltage instruction by using the DC link voltage Vdc, the voltage instruction amplitude V*, and the phase θ*, and generates the gate signals Gu+, Gu−, Gv+, Gv−, Gw+, and Gw− by PWM processing. In the gate signal generation section 11, the DC link voltage Vdc is used for pulse width correction upon the gate signal generation.

Next, a resonance suppression control block 12 will be described. The resonance suppression control block 12 receives the DC link voltage Vdc and outputs a correction signal Vcmp for resonance suppression. The correction signal Vcmp is added to the voltage instruction V* outputted through the V/f control, thereby performing compensation operation (V*+Vcmp=V'*).

The correction signal Vcmp is calculated by the following procedure. First, by using a high-pass filter 13, a pulsation component (AC component) VdcAC of the DC link voltage Vdc is extracted. Then, a gain section 14 multiplies the pulsation component VdcAC by a gain of the resonance suppression control, thereby generating the correction signal Vcmp. Then, by using an adder 15, the voltage instruction amplitude V* is corrected to V'* and the corrected value V'* is outputted.

Figure 3:
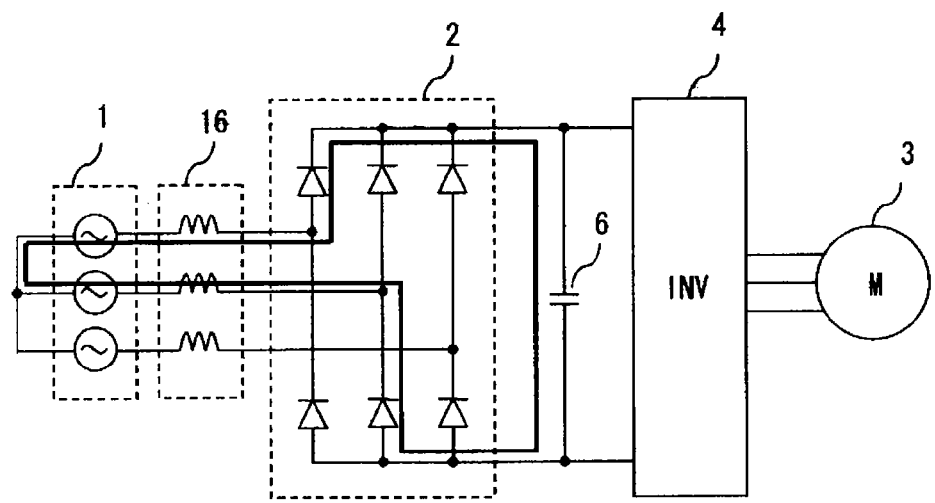
FIG. 3 is a circuit diagram showing an example of a current route causing LC resonance.

Next, a principle of reducing a pulsation of the DC link voltage Vdc by the function of the resonance suppression control block 12 in FIG. 2 will be described. FIG. 3 is a circuit diagram showing an example of a current route causing LC resonance. The circuit diagram is composed of the three-phase AC power supply 1, AC reactors 16, the converter 2, the capacitor 6, the inverter 4, and the load motor 3.

Figure 4:
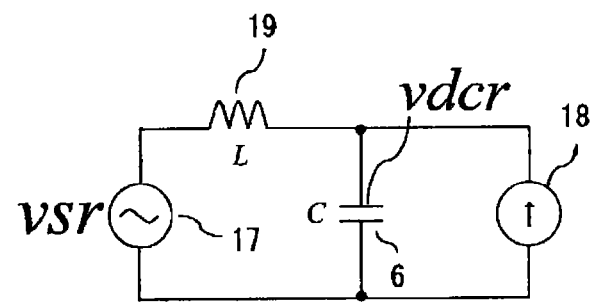
FIG. 4 is a model diagram focusing on a pulsation frequency component of DC link voltage of the power conversion apparatus.

FIG. 4 is a model focusing on a pulsation frequency component of the DC link voltage Vdc of the power conversion apparatus in FIG. 3. The model is composed of an AC power supply 17, an AC reactor 19, the capacitor 6, and a current source 18.

The AC power supply 17 is an AC power supply simulating the pulsation of the DC link voltage Vdc generated by the converter 2. Since the three-phase AC power supply 1 has three phases, here, the AC power supply 17 has a frequency f six times as high as the power supply frequency.

It is noted that since the model in FIG. 4 deals with a pulsation (ripple) component, the voltage of the AC power supply 17 is denoted by vsr and the voltage of the capacitor 6 is denoted by vdcr in order to discriminate them from Vs and Vdc of the actual circuit.

In addition, in FIG. 3, an example of a route of voltage or current that causes LC resonance is also shown. In the route shown in FIG. 3, current passes through the AC reactor 16 two times. Therefore, the AC reactor 19 shown in FIG. 4 has an inductance value two times as high as that of the AC reactor 16.

When the resonance frequency of the AC reactor 19 and the capacitor 6 coincides with the frequency f of the AC power supply 17, that is, six times of the frequency of the three-phase AC power supply 1, resonance of the system power supply occurs. At this time, an inductance L of the AC reactor 19 takes a value shown by expression (1).

[Expression 1]

$$L = \frac{1}{4\pi^2 f^2 C} \tag{1}$$

Here, the current source 18 is a model simulating the inverter 4 and the load motor 3. Since any current can be applied by controlling the inverter 4, this section is represented as a current source. At the same time, the current source simulates current flowing by the control in accordance with a pulsation of the DC link voltage.

Figure 6:
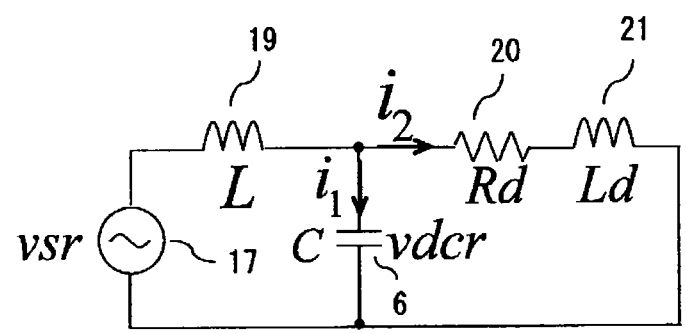
FIG. 6 is an equivalent model diagram obtained by replacing a current source 18 in the model shown in FIG. 4 with an RL circuit.

In order to clarify the operation of the resonance suppression control of the present invention, it is necessary to deliberate the behavior of the current source 18, that is, the current thereof when the correction signal Vcmp according to the pulsation component is applied. In this case, if a form of current source is used, analysis is not necessarily simple. Therefore, first, at a preliminary step of the analysis, the fact that the current source 18 in FIG. 4 can be represented as a circuit composed of a resistor and an inductance connected in series as shown in FIG. 6 described later, will be described with reference to the following expressions (2) to (6).

The load motor 3 is an AC motor, and is often controlled by dealing with various values such as the motor voltage and the motor current in a two-axis orthogonal coordinate system (dq coordinate system). Here, when an axis representing torque current of the AC motor is set as a q-axis, generally, output power P of the inverter is represented by expression (2) using q-axis voltage vq and q-axis current iq.

[Expression 2]

$$P = v_q i_q \tag{2}$$

When q-axis voltage vq of the inverter is pulsated, the output power P of the inverter and the pulsation amount ΔP thereof are represented as shown by expressions (3) and (4).

[Expression 3]

$$P + \Delta P = (v_q + \Delta v_q)(i_q + \Delta i_q) = v_q i_q + v_q \Delta i_q + \Delta v_q i_q + \Delta v_q \Delta i_q \tag{3}$$

$$\Delta P = v_q \Delta i_q + \Delta v_q i_q \tag{4}$$

Since Δiq and Δvq are minute as compared to iq and vq, ΔvqΔiq is sufficiently small to ignore. Therefore, regarding the pulsation amount ΔP, it is only necessary to consider the second and third terms on the right-hand side of expression (3), as shown by expression (4).

Figure 5:
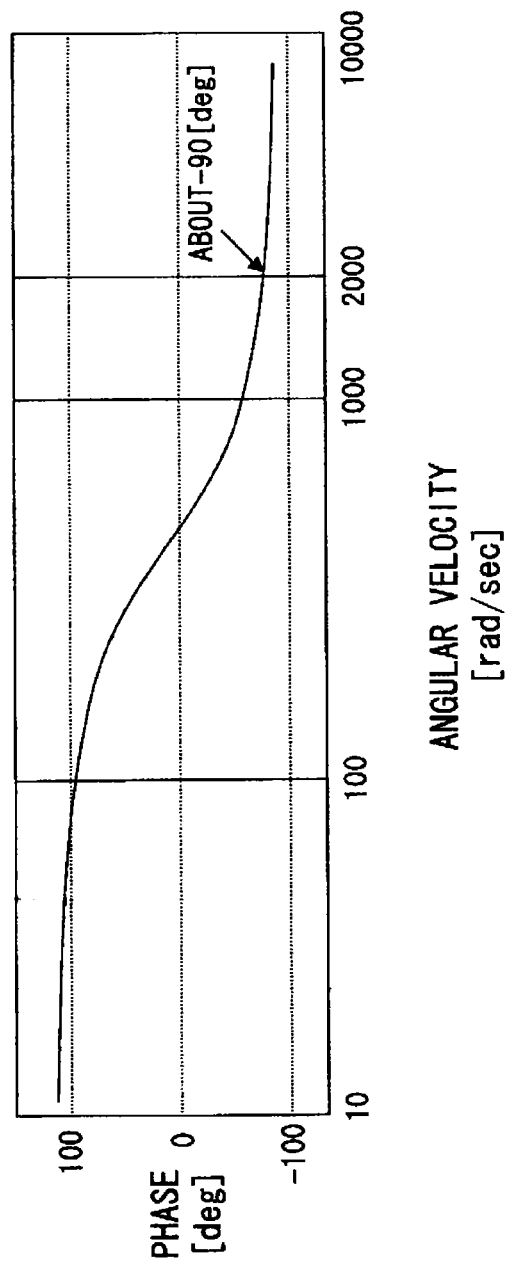
FIG. 5 is a frequency characteristic diagram showing a transfer characteristic from Δvq to Δiq of an induction motor.

FIG. 5 shows an example of the transfer characteristic of a standard induction motor of 3.7 kW. Specifically, FIG. 5 shows a frequency characteristic of a phase in the case where Δvq is an input and Δiq is an output. At a resonance frequency (about 2000 rad/s) for a power supply frequency of 50 Hz or 60 Hz, Δiq indicates a lagging characteristic of about 90 degrees relative to Δvq. Besides the induction motor, also in other types of motors such as a synchronous motor, since they electrically correspond to an RL circuit composed of a resistance and an inductance, Δiq has a lagging phase relative to Δvq.

As a result, since iq and vq are constant values, the first term vqΔiq of the pulsation power ΔP of the motor shown by expression (4) has a lagging phase relative to Δvq, and the second term Δvqiq has the same phase as that of Δvq. Therefore, the pulsation power ΔP which is the sum of both signals has a phase lagging characteristic relative to Δvq though not to the extent of Δiq.

Next, the input power P+ΔP of the inverter is represented by the following expression using an inverter input voltage Vdc and an inverter input current Idc. Here, the inverter input power=the output power is assumed.

[Expression 4]

$$P + \Delta P = V_{dc} I_{dc} \tag{5}$$

In the inverter input voltage Vdc, the DC component is large relative to the pulsation component vdcr. Therefore, the inverter input voltage Vdc can be considered to be substantially a constant value. If both sides of expression (5) are divided by Vdc, Idc is obtained by expression (6). Therefore, in the inverter input current Idc, it can be considered that a phase-lagging pulsation having the same phase as that of the pulsation amount ΔP occurs.

[Expression 5]

$$\frac{P + \Delta P}{V_{dc}} = \frac{P}{V_{dc}} + \frac{\Delta P}{V_{dc}} = I_{dc} \tag{6}$$

From the above deliberation, it is found that the current source 18 simulating the inverter and the motor in FIG. 4 has a lagging characteristic relative to Δvq. In the present invention, Δvq is a value obtained by multiplying the pulsation component vdcr of Vdc by a gain. Therefore, the current source 18 can be considered to be a load composed of a resistance and an inductance. FIG. 6 shows a circuit diagram obtained by replacing the current source 18 in the model shown in FIG. 4 with an RL circuit.

As described above, it has been confirmed that the current source 18 can be equivalently replaced with an RL circuit. Accordingly, hereinafter, based on this equivalent circuit, it will be described that the pulsation of the DC link voltage Vdc can be reduced.

Figure 7:
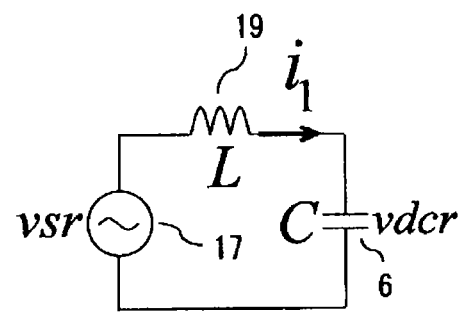
FIG. 7 is an equivalent model diagram when current flowing in the current source 18 is zero in the model shown in FIG. 4.

First, the case of not performing resonance suppression will be considered. FIG. 7 is an equivalent model when current flowing in the current source 18 is zero, that is, Rd, Ld→∞ is assumed.

transfer function from the power supply voltage vsr to the capacitor voltage vdcr will be derived. Expressions (A-1) and (A-2) can be derived from a circuit equation.

It is noted that in expressions obtained through Laplace transform shown below, Vsr, Vdcr, I1, and I2 are used as symbols for voltage vsr, voltage vdcr, current i1, and current i2, respectively.

[Expression 6]

$$V_{sr} = sLI_1 + \frac{1}{sC}I_1 \quad (A\text{-}1)$$

$$V_{dcr} = \frac{1}{sC}I_1 \quad (A\text{-}2)$$

Expression (A-2) is arranged for the current I1, to obtain expression (A-3).

[Expression 7]

$$I_1 = sCV_{dcr} \quad (A\text{-}3)$$

Expression (A-3) is substituted into expression (A-1), and the resultant expression is arranged for Vdcr/Vsr, to obtain expression (A-4).

[Expression 8]

$$\frac{V_{dcr}}{V_{sr}} = \frac{1}{1 + s^2 LC} \quad (A\text{-}4)$$

Expression s=jωc is substituted into s of expression (A-4), and the resultant expression is arranged to obtain expression (A-5).

Here, ωc is an angular frequency of the resonance frequency fc.

[Expression 9]

$$\frac{V_{dcr}}{V_{sr}} = \frac{1}{1 - \omega_c^2 LC} \quad (A\text{-}5)$$

Since the values of L and C are determined such that LC resonance occurs at the resonance frequency fc, expression (A-6) is obtained.

[Expression 10]

$$1 - \omega_c^2 LC = 0 \quad (A\text{-}6)$$

From expression (A-6), the denominator of expression (A-5) becomes zero. Therefore, the gain becomes ∞, and Vdcr diverges. Thus, a resonance phenomenon has been confirmed.

Next, in the model simulating the resonance suppression operation shown in FIG. 6, a transfer function from the power supply voltage vsr to the capacitor voltage vdcr will be derived.

Expressions (B-1) to (B-3) can be derived from a circuit equation.

[Expression 11]

$$V_{sr} = sL(I_1 + I_2) + \frac{1}{sC}I_1 \quad (B\text{-}1)$$

$$V_{dcr} = R_d I_2 + sL_d I_2 \quad (B\text{-}2)$$

$$V_{dcr} = \frac{1}{sC}I_1 \quad (B\text{-}3)$$

Expression (B-2) is arranged for I2, to obtain expression (B-4).

[Expression 12]

$$I_2 = \frac{V_{dcr}}{R_d + sL_d} \quad (B\text{-}4)$$

Expression (B-4) is substituted into expression (B-1), and the resultant expression is arranged for I1, whereby expression (B-5) can be derived.

[Expression 13]

$$I_1 = \frac{V_{sr} - \frac{sLV_{dcr}}{R_d + sL_d}}{sL + \frac{1}{sC}} \quad (B\text{-}5)$$

Expression (B-5) is substituted into expression (B-3), and the resultant expression is arranged for Vdcr/Vsr, to obtain expression (B-6).

[Expression 14]

$$\frac{V_{dcr}}{V_{sr}} = \frac{1}{1 + \frac{sL}{R_d + sL_d} + s^2 LC} \quad (B\text{-}6)$$

$$= \frac{R_d + sL_d}{R_d + s(L + L_d) + s^2 R_d L_d + s^3 LCL_d}$$

Expression s=jωc is substituted into s of expression (B-6), and the resultant expression is arranged to obtain expression (B-7).

[Expression 15]

$$\frac{V_{dcr}}{V_{sr}} = \frac{R_d + j\omega_c L_d}{R_d(1 - \omega_c^2 LC) + j\omega_c\{L + L_d(1 - \omega_c^2 LC)\}} \quad (B\text{-}7)$$

Since the values of L and C are determined such that LC resonance occurs at the resonance frequency fc, expression (B-8) is obtained.

[Expression 16]

$$1 - \omega_c^2 LC = 0 \quad \text{(B-8)}$$

By using expression (B-8), expression (B-7) is simplified, whereby expression (B-9) can be derived.

[Expression 17]

$$\frac{V_{dcr}}{V_{sr}} = \frac{R_d + j\omega_c L_d}{j\omega_c L} \quad \text{(B-9)}$$

By taking the absolute value of expression (B-9), expression (B-10) can be derived.

[Expression 18]

$$\left|\frac{V_{dcr}}{V_{sr}}\right| = \frac{\sqrt{R_d^2 + \omega_c^2 L_d^2}}{\omega_c L} \quad \text{(B-10)}$$

In comparison between expression (A-5) and expression (B-10), in resonance condition, in expression (A-5), Vdcr/Vsr becomes ∞, and meanwhile, in expression (B-10), Vdcr/Vsr becomes a finite value. Thus, the effect of pulsation suppression can be confirmed.

In addition, from expression (B-10), the smaller the impedance of the RL circuit simulating the motor and the inverter is made, the smaller the pulsation becomes. Making the impedance small corresponds to setting a gain K of the gain section 14 in the resonance suppression control block 12 in FIG. 6 shown above to be large.

FIG. 8 is a diagram showing an example of the resonance suppression operation described above, and showing comparison of the DC link voltage Vdc between the case of correcting an output voltage instruction by using the correction signal Vcmp and the case of not correcting the output voltage instruction. In the case of correcting the output voltage instruction by using the correction signal Vcmp, it can be confirmed that pulsation of the DC link voltage Vdc becomes small.

Thus, as described in embodiment 1, by using the resonance suppression control block 12, even if the frequency of the pulsation of the DC link voltage caused by the converter 2 coincides with the LC resonance frequency of the AC reactor between the power supply and the converter and the capacitor at the DC link, increase in pulsation of the DC link voltage can be suppressed and stable power can be supplied to the inverter and the motor, thereby enabling a stable operation of a system.

In addition, since the resonance suppression control block 12 does not use phase leading processing or the like, extra work for performing adjustment again in accordance with the power supply frequency can be omitted.

In addition, such increase in pulsation of the DC link voltage due to resonance often occurs in the case where the capacitor at the DC link has a small capacitance. However, this type of problem can be solved by the resonance suppression control block of the present invention.

In embodiment 1, the case where an induction motor is used as the AC load has been described as an example. However, also in the case of driving other types of motors, for example, a synchronous motor, or even an AC load other than a motor, the present invention can be applied and the same effect is provided.

Embodiment 2

As described above, when the resonance suppression control is performed, energy is transmitted between the load motor 3 and the capacitor 6, thus resulting in increase in torque ripple of the load motor 3.

The condition in which the resonance suppression control is needed is that the system resonance frequency coincides with six times of the power supply frequency, and in addition, output of the load motor 3 is large.

Figure 9:
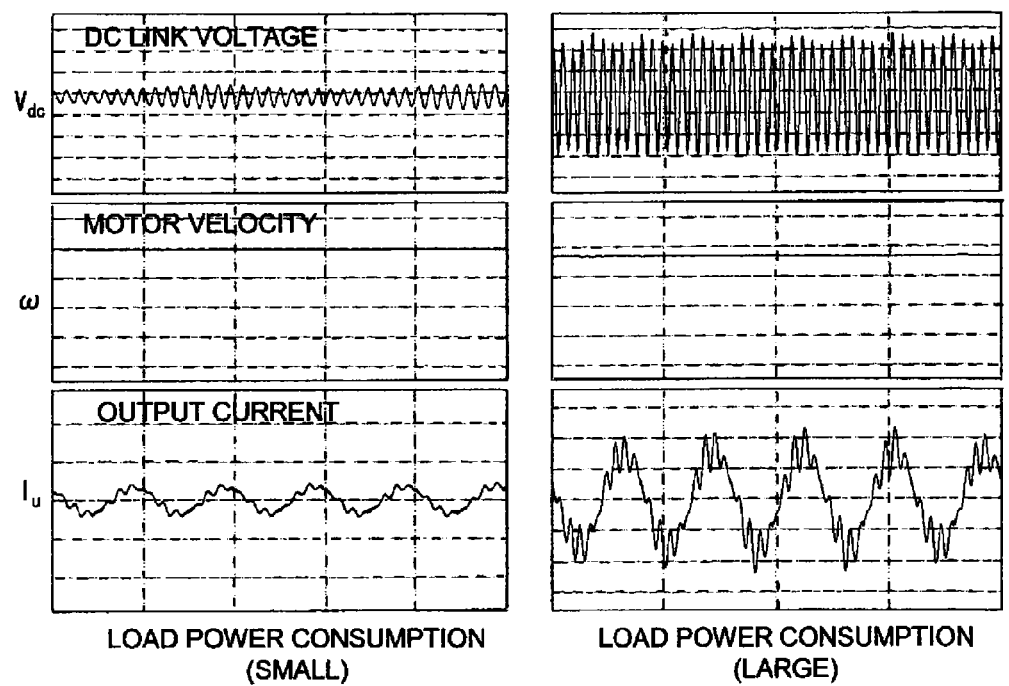
FIG. 9 is a characteristic diagram showing the upper limit and the lower limit of the DC link voltage, depending on load power.

FIG. 9 shows this phenomenon, and shows an example of the relationship between power consumption of the load and pulsation of the DC link voltage in the case where the system resonance frequency coincides with six times of the power supply frequency. The left side shows the DC link voltage, the motor velocity, and the output current in the case where the load power consumption is small, and the right side shows those in the case where the load power consumption is large.

The larger the output of the load motor 3 is, the larger the power consumption is. Therefore, current flowing into the capacitor 6 increases and therefore pulsation of the DC link voltage increases. On the other hand, when the power consumption of the load motor 3 is small, the flowing current decreases, and therefore pulsation of the DC link voltage decreases even if the system resonance frequency coincides with six times of the power supply frequency. Therefore, in such a case, the DC link voltage does not greatly pulsate even if the resonance suppression control is not performed.

Embodiment 2 of the present invention considers the technical circumstances described above, and thus shows a configuration of performing the resonance suppression control described in embodiment 1 only when the condition in which the resonance suppression control is needed occurs. In order to realize the configuration, a resonance suppression control adjustment section 22 is provided in addition to the configuration of embodiment 1.

It is noted that the resonance suppression control needs to be performed when overvoltage occurs by the DC link voltage pulsation or when voltage saturation in which the DC link voltage level required by a voltage instruction is not reached occurs by the pulsation, too.

Figure 10:
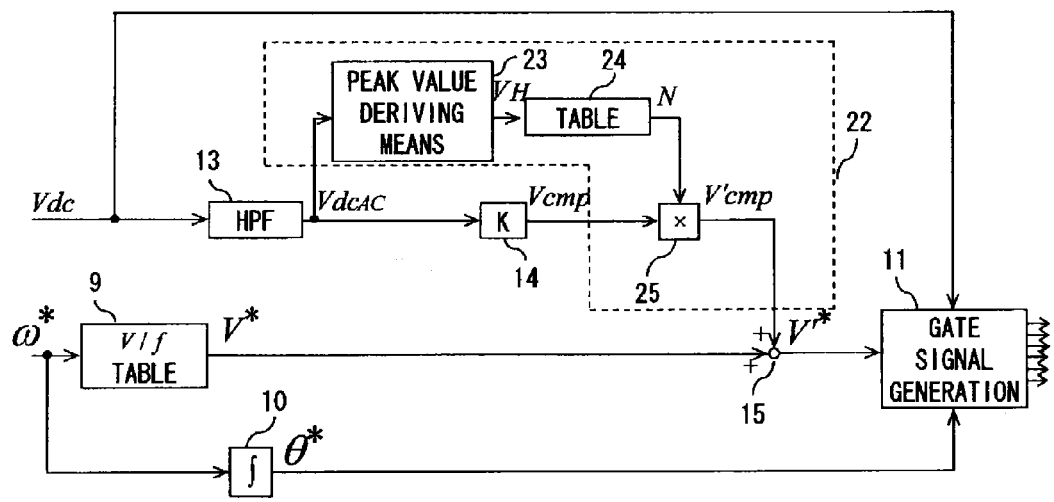
FIG. 10 is a block diagram showing the internal configuration of the control unit 7 according to embodiment 2 of the present invention.

FIG. 10 is an internal configuration diagram of the control unit 7 according to embodiment 2. Hereinafter, the details of the internal configuration will be described focusing on the resonance suppression control adjustment section 22. An adjustment coefficient N in the resonance suppression control adjustment section 22 is a coefficient for determining the degree of the resonance suppression control. The adjustment coefficient N takes a value of 0 to 1, and has a function of weakening the resonance suppression as approaching to 0 and strengthening the resonance suppression as approaching to 1.

The adjustment coefficient N and the correction signal Vcmp are multiplied by a multiplier 25, thereby deriving an adjusted correction signal V'cmp, and then the output voltage amplitude V* is corrected by the adder 15.

Hereinafter, the derivation method for the adjustment coefficient N will be described.

Peak value deriving means 23 receives a pulsation component (AC component) VdcAC of the DC link voltage and derives an amplitude VH of the pulsation voltage of the DC link voltage. The peak value deriving means 23 performs an operation like envelope detection as described later, thereby extracting the magnitude of oscillation of the pulsation component VdcAC.

The necessity of resonance suppression can be judged by the magnitude of the amplitude VH of the pulsation component. The larger the amplitude VH is, the higher the necessity of resonance suppression is, and therefore, the adjustment coefficient N should be increased. On the other hand, the smaller the amplitude VH is, the lower the necessity of resonance suppression is, and therefore, the adjustment coefficient N should be decreased. The adjustment coefficient N is determined from the pulsation voltage amplitude VH, by using a table 24.

The peak value deriving means 23 receives the pulsation component VdcAC of the DC link voltage, and outputs the amplitude VH of the pulsation voltage. The operation of the peak value deriving means 23 is represented by expressions (C-1) and (C-2).

[Expression 19]

$$V_H(t)=|V_{dcAC}(t)| \text{ condition}(i)|V_{dcAC}(t)|>V_H(t-1) \quad (C-1)$$

$$V_H(t)=V_H(t-1)+\alpha\{|V_{dcAC}(t)|-|V_{dcAC}(t-1)|\} \text{ condition} \\ (ii)|V_{dcAC}(t)| \le V_H(t-1) \quad (C-2)$$

Here, t denotes a value at the present, and (t−1) denotes a value one sample before.

When an absolute value |VdcAC| of the pulsation component at the present is larger than the value one sample before, a condition (i) of expression (C-1) is satisfied and |VdcAC (t)| is used as the amplitude VH (t) of the pulsation voltage. When the absolute value at the present is equal to or smaller than the value one sample before, a condition (ii) of expression (C-2) is satisfied, and VH (t) is determined based on this expression containing α as a coefficient, actually by using a low-pass filter. That is, VH (t−1) is updated to VH (t) in accordance with a value obtained by multiplying the variation amount of the pulsation component by the coefficient α. A decimal close to 0 is used as α.

Figure 11:
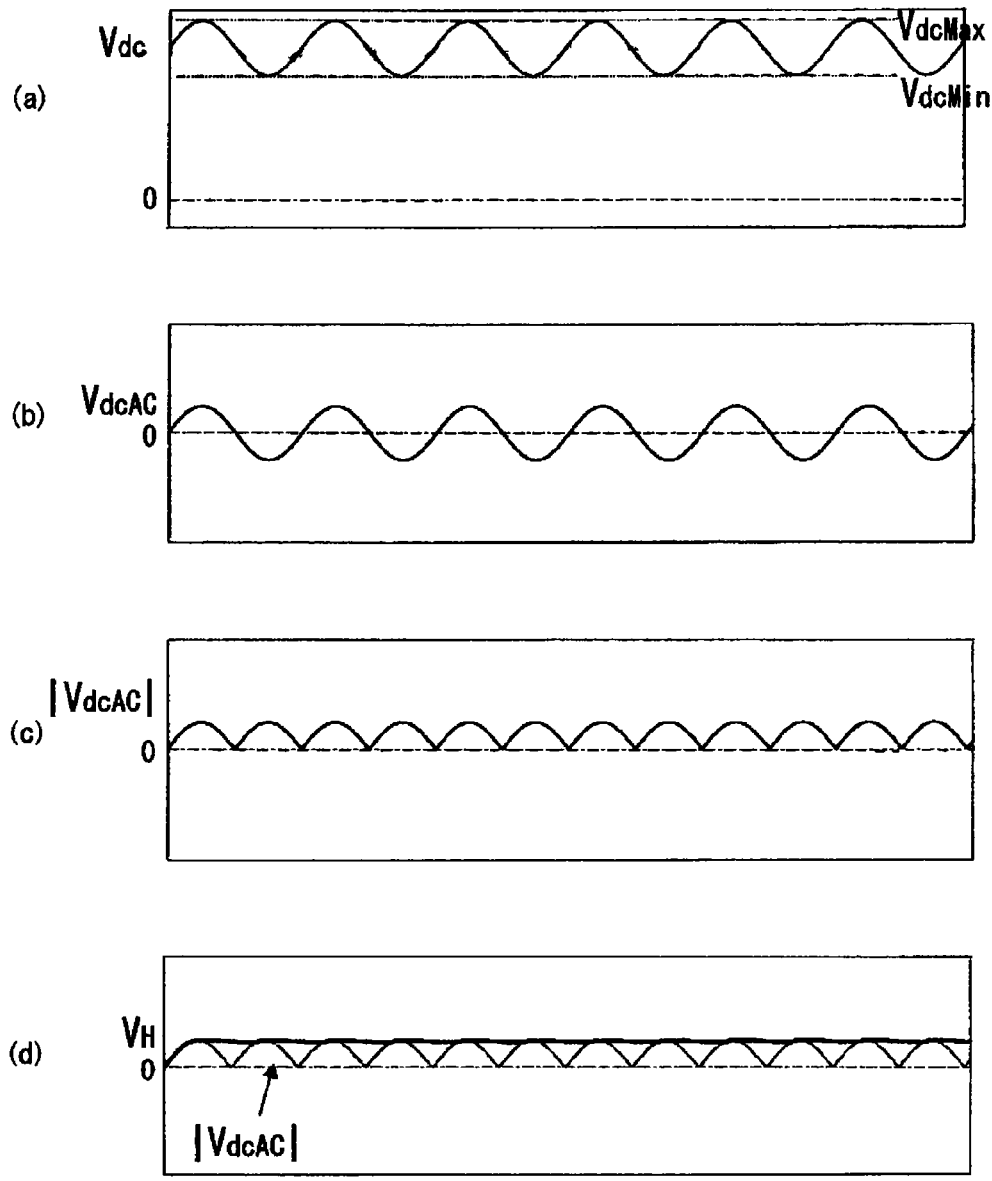
FIG. 11 is a characteristic diagram showing an example of the waveforms of |VdcAC| and VH.

FIG. 11 is a diagram showing an example of the waveforms of |VdcAC| and VH. It can be confirmed that VH has a value along the peak value of |VdcAC|.

Thus, by making the amplitude VH of the pulsation voltage easy to increase, even when the pulsation of the DC link voltage rapidly increases, the condition (i) is satisfied and the increase can be immediately reflected in the amplitude VH. On the other hand, regarding decrease in the amplitude VH of the pulsation voltage, by making the amplitude VH hard to decrease, rapid ON/OFF switching of the resonance suppression control can be prevented from being successively repeated, thereby enabling a stable operation of the resonance suppression control.

In the description of expressions (C-1) and (C-2) and FIG. 11, the peak value has been obtained by using the absolute value of the pulsation voltage. However, the peak value may be obtained by using the pulsation voltage itself. In this case, although oscillation of the outputted peak value slightly increases, there is an advantage that the calculation circuit is simplified because the calculation of the absolute value becomes unnecessary.

The table 24 receives the amplitude VH and outputs the adjustment coefficient N. As described above, the larger the amplitude VH is, the higher the necessity of the resonance suppression control is, and therefore, the adjustment coefficient is set so as to approach to 1 as the amplitude VH increases. In addition, in order to prevent rapid change in the strength of the resonance suppression control, a certain degree of inclination is set.

Figure 12:
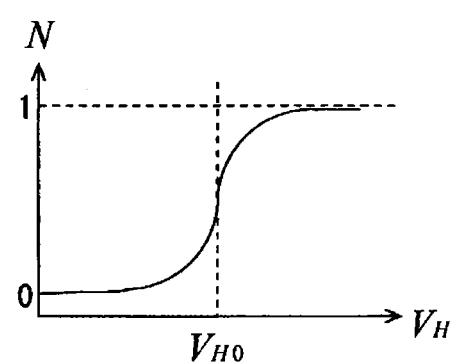
FIG. 12 is a diagram showing an input-output characteristic of a table 24 shown in FIG. 10.

FIG. 12 is a diagram showing an example of a relationship characteristic between VH and N in the table 24. Here, VH0 is a value as a rough indication of the ON/OFF boundary of the resonance suppression. If the control is performed by using the table 24, the pulsation peak value of Vdc generally becomes a value close to VH0.

Thus, as described in embodiment 2, by performing the resonance suppression control while strengthening or weakening the resonance suppression control, the resonance suppression control is performed only when the system resonance frequency coincides with six times of the power supply frequency and the load motor is subjected to heavy loading, thereby preventing overvoltage and voltage saturation and minimizing increase in the motor torque ripple. Thus, the durability increases.

Embodiment 3

Similarly to the above embodiment 2, embodiment 3 of the present invention also performs operation of the resonance suppression control only when a condition in which the resonance suppression control is needed occurs. Further, in embodiment 3, the adjustment coefficient N is obtained from an overvoltage level of the DC link or the magnitude of an output voltage instruction.

In a method for obtaining the adjustment coefficient N from the overvoltage level, the adjustment coefficient N is derived from a DC link voltage maximum value VdcMax and an overvoltage level of the DC link. The DC link voltage maximum value VdcMax is a value calculated in such a way as to trace the maximum value of the DC link voltage while eliminating pulsation of the DC link voltage.

In a method for obtaining the adjustment coefficient N from the magnitude of a voltage instruction, the adjustment coefficient N is derived from a DC link voltage minimum value VdcMin and the output voltage instruction amplitude V*. The DC link voltage minimum value VdcMin is a value calculated in such a way as to trace the minimum value of the DC link voltage while eliminating pulsation of the DC link voltage.

It is noted that calculation of the DC link voltage maximum value VdcMax and the DC link voltage minimum value VdcMin corresponds to calculation of portions indicated by dotted lines of Vdc in FIG. 11(*a*) shown above.

Figure 13:
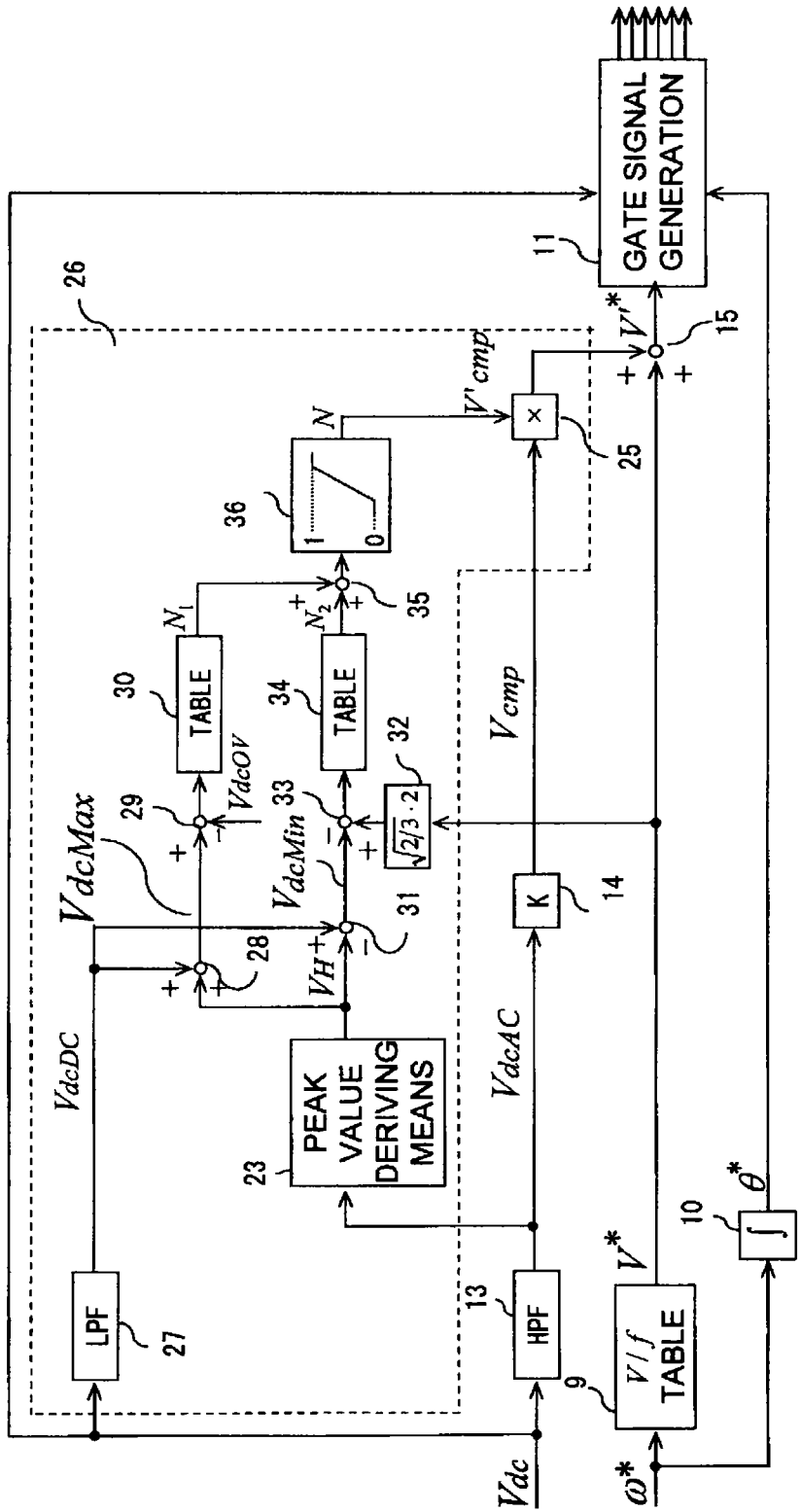
FIG. 13 is a block diagram showing the internal configuration of the control unit 7 according to embodiment 3 of the present invention.

FIG. 13 is an internal configuration diagram of the control unit 7 according to embodiment 3. In FIG. 13, the adjustment coefficient N is derived by using both of an overvoltage level of the DC link voltage and the magnitude of the voltage instruction.

Hereinafter, a resonance suppression control adjustment section 26 surrounded by a dotted line will be described focusing on a part different from the resonance suppression control adjustment section 22 of the above embodiment 2.

The DC link voltage Vdc is divided into a DC component VdcDC and an AC component VdcAC. The DC component is extracted by using a low-pass filter 27, and the AC component is extracted by using the high-pass filter 13.

Based on the AC component VdcAC, the amplitude VH of a pulsation component is derived by using the peak value deriving means 23.

The amplitude VH of the pulsation component and the DC component VdcDC are added by the adder 28, thereby deriving the DC link voltage maximum value VdcMax. Therefore, maximum value deriving means of claims of the present application is composed of, in this example, the high-pass filter 13, the peak value deriving means 23, the low-pass filter 27, and the adder 28.

An overvoltage level VdcOV of the DC link is subtracted from the DC link voltage maximum value VdcMax by a subtractor 29, and then an adjustment coefficient N1 is determined by a table 30. Thus, N1 is an adjustment coefficient based on the overvoltage level.

Here, for preventing overvoltage, it is advantageous to set the overvoltage level VdcOV at a value smaller than an overvoltage level required by the inverter or the like, in consideration of response lag in the resonance suppression control.

Meanwhile, the amplitude VH of the pulsation component is subtracted from the DC component VdcDC by a subtractor 31, thereby deriving a DC link voltage minimum value VdcMin. Therefore, minimum value deriving means of claims of the present application is composed of, in this example, the high-pass filter 13, the peak value deriving means 23, the low-pass filter 27, and the subtractor 31.

The output voltage instruction V* is multiplied by a gain 32, thereby calculating DC link voltage needed for realizing V*. The DC link voltage minimum value VdcMin is subtracted from the needed voltage by a subtractor 33, and then an adjustment coefficient N2 is determined by a table 34. Thus, N2 is an adjustment coefficient based on the output voltage instruction.

Figure 14:
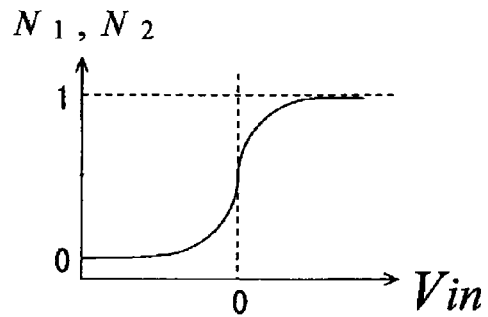
FIG. 14 is a diagram showing input-output characteristics of tables 30 and 34 shown in FIG. 13.

FIG. 14 is a diagram showing an example of the input-output characteristics of the tables 30 and 34. Vin is an input to each table and N1 or N2 is an output therefrom.

The adjustment coefficients N1 and N2 are added by an adder 35, and then the resultant value is limited to 0 to 1 by using a limiter 36, thereby deriving the adjustment coefficient N.

Thus, the resonance suppression control adjustment section 26 operates so as to, when the maximum value VdcMax of the voltage of the DC link section exceeds a predetermined overvoltage level VdcOV set in advance, adjust the magnitude of the correction signal Vcmp in a direction to turn the correction signal Vcmp from off to on. And when the minimum value VdcMin of the voltage of the DC link section becomes smaller than a predetermined required voltage level (a value obtained by multiplying the output voltage instruction V* by the gain 32) set in advance based on the voltage instruction V*, the resonance suppression control adjustment section 26 adjusts the magnitude of the correction signal Vcmp in a direction to turn the correction signal Vcmp from off to on.

Thus, as described in embodiment 3, the resonance suppression control adjustment section 26 adjusts the resonance suppression control by using the adjustment coefficient N, thereby providing the effect of, while minimizing increase in the motor torque ripple due to the resonance suppression control, preventing overvoltage of the DC link caused by resonance of the DC link voltage and preventing saturation of a voltage instruction due to insufficient DC link voltage.

It is noted that, although the circuit shown in FIG. 13 multiplies the correction signal Vcmp by the adjustment coefficient obtained by combining the adjustment coefficients N1 and N2, the correction signal Vcmp may be multiplied by an adjustment coefficient obtained by employing only one of the adjustment coefficients N1 and N2.

Embodiment 4

Figure 15:
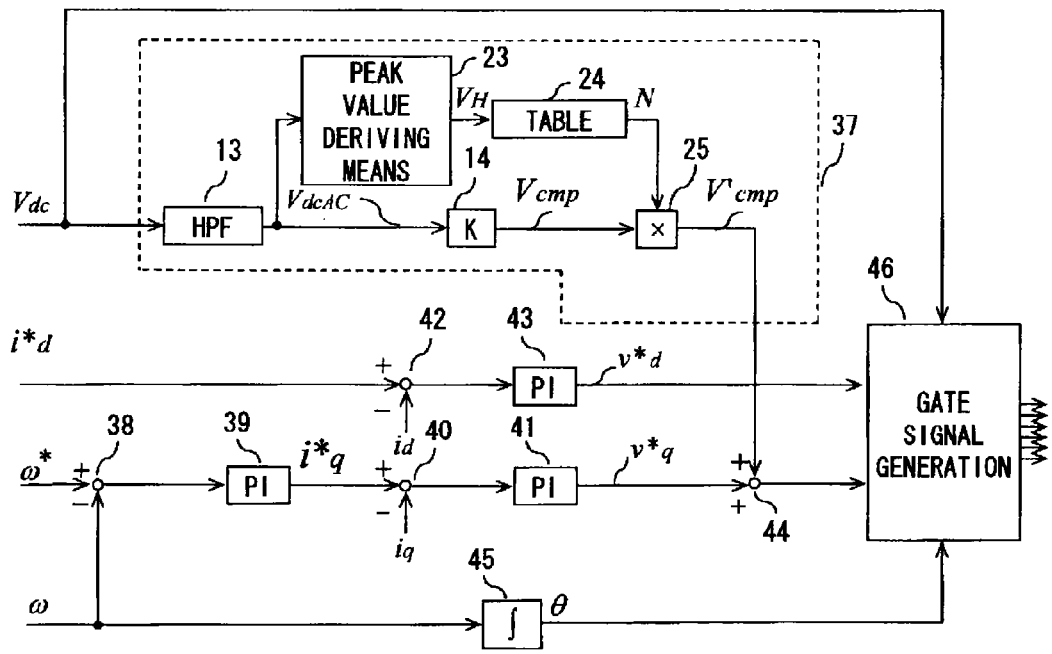
FIG. 15 is a block diagram showing the internal configuration of the control unit 7 according to embodiment 4 of the present invention.

In the above embodiments 1 to 3, an example of application to a motor control system based on V/f control has been described. However, the present invention may be applied to a motor control system based on a velocity control system or a current control system. FIG. 15 is an internal configuration diagram of the control unit 7 according to embodiment 4, which corresponds to a resonance suppression control block diagram in the case where a velocity control system is applied to a synchronous motor.

This resonance suppression control block is obtained by replacing the control block described in the above embodiment 2 with that for a velocity control system, and the resonance suppression control is realized by adding correction to a q-axis voltage instruction vq*. A resonance suppression control block 37 is the same as that of embodiment 2.

Hereinafter, the details of the configuration relevant to a voltage instruction generation section in the block diagram will be described. The deviation between a velocity (frequency) instruction ω* and a motor velocity (frequency) ω which is a velocity detection value is derived by a subtractor 38, and then a q-axis current instruction iq* is generated so as to make the motor velocity w follow the velocity instruction ω* by using a PI controller 39. The deviation between the q-axis current instruction iq* and the q-axis current iq is derived by the subtractor 40, and then a q-axis voltage instruction vq* is generated so as to make the q-axis current iq follow the q-axis current instruction iq* by using a PI controller 41. Also in a d-axis, the deviation between the current instruction id* and the d-axis current id is derived by a subtractor 42, and then a d-axis voltage instruction vd* is generated by a PI controller 43.

Correction voltage V'cmp for resonance suppression control is added to the q-axis voltage instruction vq* by an adder 44, thereby correcting the q-axis voltage instruction vq*. Thus, the corrected q-axis voltage instruction vq* is derived. The actual velocity ω is inputted to an integrator 45, whereby a phase angle θ is derived.

By using the DC link voltage Vdc, the d-axis voltage instruction vd*, the corrected q-axis voltage instruction vq'*, and the phase angle θ, a gate signal generation section 46 performs inverse dq conversion to generate an output voltage instruction for each phase, and then generates the gate signals Gu+, Gu−, Gv+, Gv−, Gw+, and Gw− by PWM processing.

Also in the present embodiment 4, the same effect as that of the above embodiment 2 can be obtained. That is, by performing the resonance suppression control while strengthening or weakening the resonance suppression control, the resonance suppression control is performed only when the system resonance frequency coincides with six times of the power supply frequency and the load motor is subjected to heavy loading, thereby preventing overvoltage and voltage saturation and minimizing increase in the motor torque ripple.

Further, by modifying embodiment 4 as necessary, the same effect as that of the above embodiment 3 can be obtained. That is, it becomes possible to, while minimizing increase in the motor torque ripple due to the resonance suppression control, prevent overvoltage of the DC link caused by resonance of the DC link voltage and prevent saturation of a voltage instruction due to insufficient DC link voltage.

It is noted that, within the scope of the present invention, the above embodiments may be freely combined with each other, or each of the above embodiments may be modified or abbreviated as appropriate.

The invention claimed is:

1. A power conversion apparatus comprising:
a converter connected between an AC power supply and a DC link section, for converting AC power of the AC power supply to DC power and outputting the DC power to the DC link section;
an inverter connected between the DC link section and an AC load, for converting DC power of the DC link section to AC power and supplying the AC power to the AC load;
a capacitor connected in the DC link section; and
a control section for controlling the inverter based on a voltage instruction, wherein
the power conversion apparatus includes: a voltage detection section for detecting voltage of the DC link section; a filter section for extracting an AC component of the voltage detected by the voltage detection section; and a gain section for multiplying the AC component extracted by the filter section, by a predetermined gain, thereby outputting a correction signal, the control section controls the inverter based on a signal obtained by adding the correction signal to the voltage instruction, and the power conversion apparatus includes peak value deriving means for outputting a peak value of the AC component extracted by the filter section, so that the magnitude of the correction signal is adjusted based on the peak value of the AC component outputted from the peak value deriving means.

2. The power conversion apparatus according to claim 1, wherein the peak value deriving means when the peak value one sample before is larger than the value of the AC component at the present extracted by the filter section, directly outputs the value of the AC component as the peak value, and when the peak value one sample before is smaller than the value of the AC component at the present extracted by the filter section, updates the peak value in accordance with a value obtained by multiplying the variation amount of the AC component by a predetermined coefficient by using a low-pass filter.

3. The power conversion apparatus according to claim 1, wherein the peak value deriving means when the peak value one sample before is larger than the absolute value of the AC component at the present extracted by the filter section, directly outputs the absolute value of the AC component as the peak value, and when the peak value one sample before is smaller than the absolute value of the AC component at the present extracted by the filter section, updates the peak value in accordance with a value obtained by multiplying the variation amount of the absolute value of the AC component by a predetermined coefficient by using a low-pass filter.

4. The power conversion apparatus according to claim 1, wherein the AC load is an AC motor, and the control section includes a voltage instruction generation section for generating the voltage instruction based on a velocity instruction.

5. The power conversion apparatus according to claim 4, wherein the voltage instruction generation section is a V/f control section for generating the voltage instruction from the velocity instruction, based on a relationship of (voltage/frequency) =constant, and the control section controls the inverter based on a signal obtained by adding the correction signal to the voltage instruction generated by the V/f control section.

6. The power conversion apparatus according to claim 4, wherein the voltage instruction generation section is a velocity control section for generating a q-axis voltage instruction in a dq two-axis orthogonal coordinate system so as to make a velocity detection value follow the velocity instruction, and the control section controls the inverter based on a signal obtained by adding the correction signal to the q-axis voltage instruction generated by the velocity control section.

7. A power conversion apparatus comprising:

a converter connected between an AC power supply and a DC link section, for converting AC power of the AC power supply to DC power and outputting the DC power to the DC link section;

an inverter connected between the DC link section and an AC load, for converting DC power of the DC link section to AC power and supplying the AC power to the AC load;

a capacitor connected in the DC link section; and a control section for controlling the inverter based on a voltage instruction, wherein the power conversion apparatus includes: a voltage detection section for detecting voltage of the DC link section; a filter section for extracting an AC component of the voltage detected by the voltage detection section; and a gain section for multiplying the AC component extracted by the filter section, by a predetermined gain, thereby outputting a correction signal, the control section controls the inverter based on a signal obtained by adding the correction signal to the voltage instruction, and the power conversion apparatus includes maximum value deriving means for outputting a maximum value of the voltage of the DC link section detected by the voltage detection section, so that the magnitude of the correction signal is adjusted based on the maximum value of the voltage of the DC link section outputted from the maximum value deriving means.

8. The power conversion apparatus according to claim 7, wherein when the maximum value of the voltage of the DC link section outputted from the maximum value deriving means exceeds a predetermined overvoltage level set in advance, the magnitude of the correction signal is adjusted in a direction to turn the correction signal from off to on.

9. The power conversion apparatus according to claim 7, further comprising:

peak value deriving means for outputting a peak value of the AC component extracted by the filter section; and a low-pass filter section for extracting a DC component of the voltage detected by the voltage detection section, wherein the maximum value deriving means adds the peak value of the AC component obtained by the peak value deriving means to the DC component, thereby deriving the maximum value of the voltage of the DC link section.

10. The power conversion apparatus according to claim 9, wherein the peak value deriving means when the peak value one sample before is larger than the value of the AC component at the present extracted by the filter section, directly outputs the value of the AC component as the peak value, and when the peak value one sample before is smaller than the value of the AC component at the present extracted by the filter section, updates the peak value in accordance with a value obtained by multiplying the variation amount of the AC component by a predetermined coefficient by using a low-pass filter.

11. The power conversion apparatus according to claim 9, wherein the peak value deriving means when the peak value one sample before is larger than the absolute value of the AC component at the present extracted by the filter section, directly outputs the absolute value of the AC component as the peak value, and when the peak value one sample before is smaller than the absolute value of the AC component at the present extracted by the filter section, updates the peak value in accordance with a value obtained by multiplying the variation amount of the absolute value of the AC component by a predetermined coefficient by using a low-pass filter.

12. A power conversion apparatus comprising:
a converter connected between an AC power supply and a DC link section, for converting AC power of the AC power supply to DC power and outputting the DC power to the DC link section;
an inverter connected between the DC link section and an AC load, for converting DC power of the DC link section to AC power and supplying the AC power to the AC load;
a capacitor connected in the DC link section; and
a control section for controlling the inverter based on a voltage instruction, wherein
the power conversion apparatus includes: a voltage detection section for detecting voltage of the DC link section; a filter section for extracting an AC component of the voltage detected by the voltage detection section; and a gain section for multiplying the AC component extracted by the filter section, by a predetermined gain, thereby outputting a correction signal,
the control section controls the inverter based on a signal obtained by adding the correction signal to the voltage instruction, and
the power conversion apparatus includes minimum value deriving means for outputting a minimum value of the voltage of the DC link section detected by the voltage detection section, so that the magnitude of the correction signal is adjusted based on the minimum value of the voltage of the DC link section outputted from the minimum value deriving means.

13. The power conversion apparatus according to claim 12, wherein
when the minimum value of the voltage of the DC link section outputted from the minimum value deriving means becomes lower than a predetermined required voltage level set in advance based on the voltage instruction, the magnitude of the correction signal is adjusted in a direction to turn the correction signal from off to on.

14. The power conversion apparatus according to claim 9, further comprising:
peak value deriving means for outputting a peak value of the AC component extracted by the filter section; and
a low-pass filter section for extracting a DC component of the voltage detected by the voltage detection section, wherein
the minimum value deriving means subtracts the peak value of the AC component obtained by the peak value deriving means from the DC component, thereby deriving the minimum value of the voltage of the DC link section.

15. The power conversion apparatus according to claim 14, wherein the peak value deriving means
when the peak value one sample before is larger than the value of the AC component at the present extracted by the filter section, directly outputs the value of the AC component as the peak value, and
when the peak value one sample before is smaller than the value of the AC component at the present extracted by the filter section, updates the peak value in accordance with a value obtained by multiplying the variation amount of the AC component by a predetermined coefficient by using a low-pass filter.

16. The power conversion apparatus according to claim 14, wherein the peak value deriving means
when the peak value one sample before is larger than the absolute value of the AC component at the present extracted by the filter section, directly outputs the absolute value of the AC component as the peak value, and
when the peak value one sample before is smaller than the absolute value of the AC component at the present extracted by the filter section, updates the peak value in accordance with a value obtained by multiplying the variation amount of the absolute value of the AC component by a predetermined coefficient by using a low-pass filter.

* * * * *

UNITED STATES PATENT AND TRADEMARK OFFICE
CERTIFICATE OF CORRECTION

PATENT NO.        : 8,970,154 B2
APPLICATION NO.   : 13/880292
DATED             : March 3, 2015
INVENTOR(S)       : Shuta Ishikawa et al.

It is certified that error appears in the above-identified patent and that said Letters Patent is hereby corrected as shown below:

In the Claims

Column 18, line 1, change "claim 9" to --claim 12--.

Signed and Sealed this
Eleventh Day of August, 2015

Michelle K. Lee
*Director of the United States Patent and Trademark Office*